(12) United States Patent
Hino et al.

(10) Patent No.: US 6,887,652 B2
(45) Date of Patent: May 3, 2005

(54) HIGH DENSITY OPTICAL DISK, APPARATUS FOR REPRODUCING OPTICAL DISK AND METHOD FOR PRODUCING OPTICAL DISK MASTER

(75) Inventors: Yasumori Hino, Ikoma (JP); Norio Miyatake, Kobe (JP); Tadashi Nakamura, Katano (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 9 days.

(21) Appl. No.: 09/848,046

(22) Filed: May 3, 2001

(65) Prior Publication Data

US 2001/0026505 A1 Oct. 4, 2001

Related U.S. Application Data

(62) Division of application No. 09/128,121, filed on Aug. 3, 1998, now Pat. No. 6,252,845.

(30) Foreign Application Priority Data

Aug. 5, 1997 (JP) .............................................. 9-210266
Aug. 5, 1997 (JP) .............................................. 9-210267

(51) Int. Cl.$^7$ ............................. G11B 7/095; G03C 5/00
(52) U.S. Cl. .................... 430/321; 430/945; 369/275.2; 369/277
(58) Field of Search ................................ 430/445, 321; 369/275.2, 277, 275.4

(56) References Cited

U.S. PATENT DOCUMENTS

| 5,168,482 | A |   | 12/1992 | Aratani et al. ................. 369/13 |
| 5,289,231 | A |   | 2/1994 | Magome et al. .............. 355/53 |
| 5,422,874 | A |   | 6/1995 | Birukawa et al. ......... 369/275.2 |
| 5,511,063 | A | * | 4/1996 | Kawase .................... 369/275.3 |
| 5,754,506 | A |   | 5/1998 | Nagasawa et al. ....... 369/44.26 |
| 5,805,565 | A |   | 9/1998 | Miyamoto et al. ........ 369/275.4 |
| 5,867,474 | A |   | 2/1999 | Nagasawa et al. ....... 369/275.4 |
| 5,898,663 | A |   | 4/1999 | Miyamoto et al. ....... 369/235.4 |
| 6,252,845 | B1 | * | 6/2001 | Hino et al. ............... 369/275.3 |

FOREIGN PATENT DOCUMENTS

| EP | 0193614 |   | 9/1986 |
| EP | 0 304 312 A1 |   | 2/1989 |
| EP | 0570235 |   | 11/1993 |
| EP | 0727779 |   | 8/1996 |
| JP | 62-222837 | * | 10/1987 |
| JP | 01-052236 | * | 2/1989 |
| JP | 01 185 851 |   | 7/1989 |
| JP | 02-126436 | * | 5/1990 |
| JP | 04-047543 | * | 2/1992 |
| JP | 04-195939 | * | 7/1992 |
| JP | 4271039 |   | 9/1992 |
| JP | 05-189813 | * | 7/1993 |
| JP | 07-093828 | * | 4/1995 |

OTHER PUBLICATIONS

European Search Report dated May 4, 2000 for corresponding EP application No. 98114707 7 2210.
European Search Report dated Feb. 26, 2001 regarding Application No. 98114707.7.

* cited by examiner

*Primary Examiner*—Martin Angebranndt
(74) *Attorney, Agent, or Firm*—Renner Otto, Boisselle & Sklar, LLP

(57) ABSTRACT

An optical disk includes at least one region along a radial direction, and a plurality of tracks provided in the at least one region. The at least one region contains address regions radially positioned on the plurality of tracks. In the address regions, data which is common between two adjacent tracks of the plurality of tracks is recorded at positions aligned along the same radial direction on the two adjacent tracks, and data which is not common between the two adjacent tracks is recorded at positions along different radial directions on the two adjacent tracks.

6 Claims, 6 Drawing Sheets

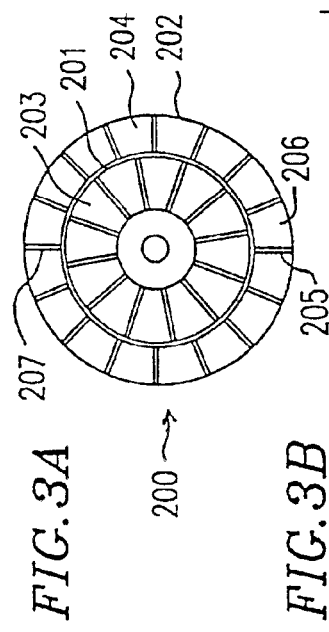
FIG.3A
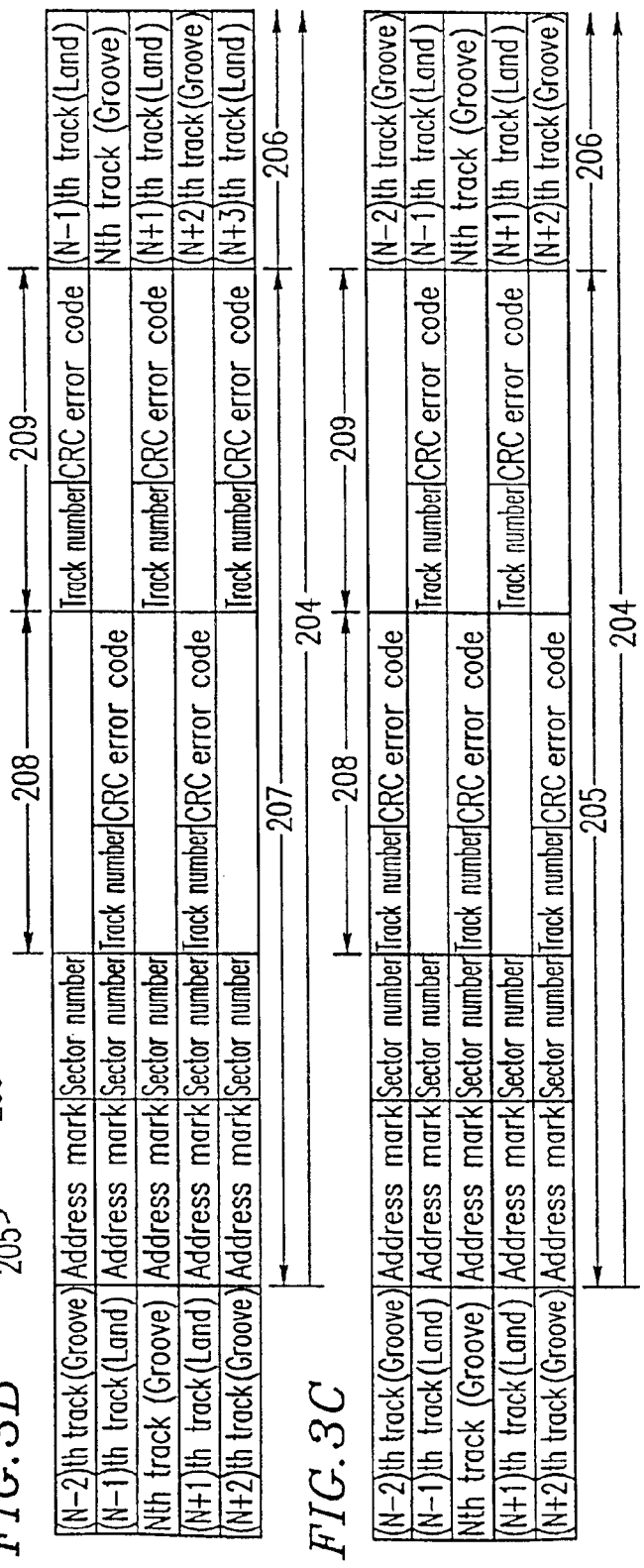
FIG.3B
FIG.3C

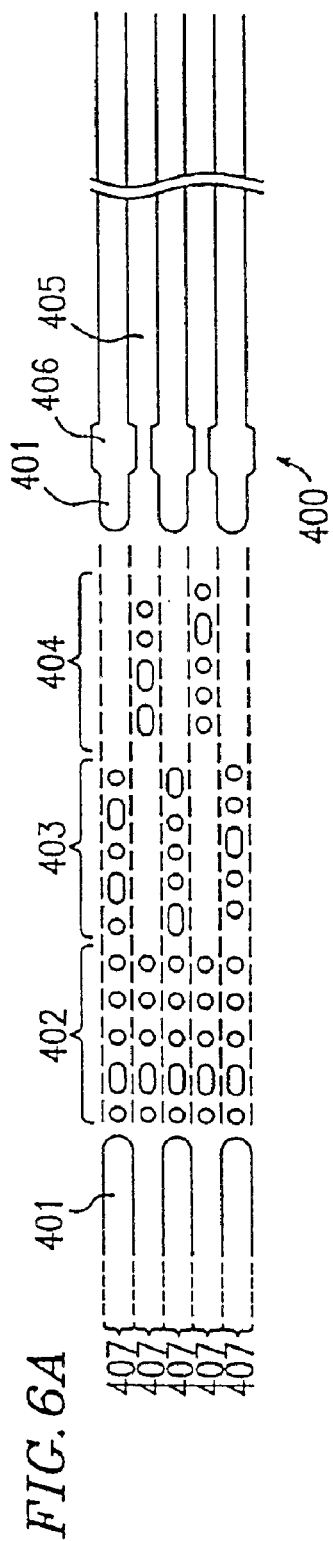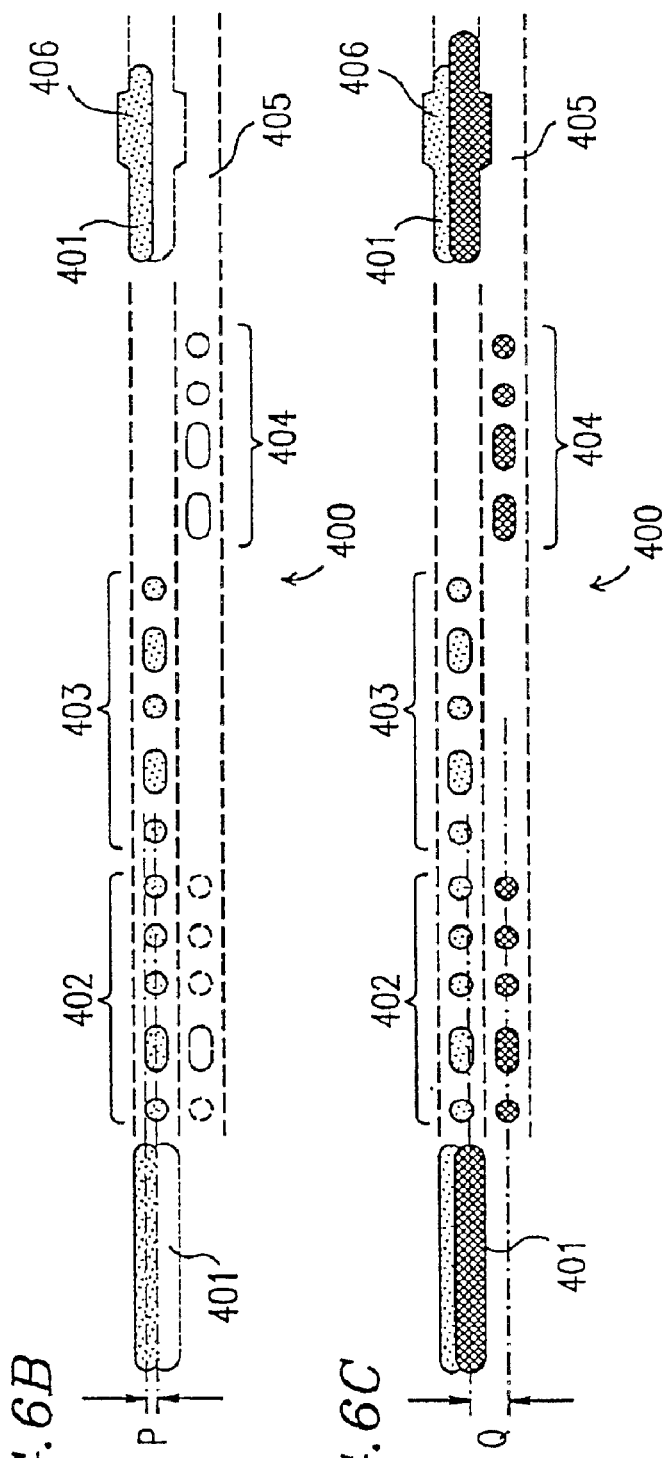
FIG. 6A
FIG. 6B
FIG. 6C

HIGH DENSITY OPTICAL DISK, APPARATUS FOR REPRODUCING OPTICAL DISK AND METHOD FOR PRODUCING OPTICAL DISK MASTER

This is a division of application Ser. No. 09/128,121, filed Aug. 3, 1998 now U.S. Pat. No. 6,252,845.

BACKGROUND OF THE INVENTION

1. Field of the Invention

The present invention relates to an optical disk from/onto which data is reproduced/recorded by utilizing laser light; an optical disk apparatus which reads out or records signals using an optical disk; and a method for producing an optical disk master.

2. Description of the Related Art

In recent years, an optical disk has been widely used as a medium for storing mass data files such as music, an image, and the like. Studies for increasing the capacity of an optical disk have been made in order to realize a wider range for its use.

At present, due to the partial response technique, a recording density of an optical disk apparatus is about 0.4 $\mu$m/bit in a linear density direction, and about 1.2 $\mu$m/track.

In order to realize a higher density optical disk, various methods have been suggested. One of such methods is a super-resolution readout method in which a reproducing film of an optical disk has a super-resolution reproducing effect (see U.S. Pat. No. 5,168,482). The "super-resolution reproducing effect" refers to high-resolution reproduction wherein its resolution level exceeds the resolution level for collected light beam. Such high-resolution reproduction is realized by using a reproducing film heated by a light beam collected onto an optical disk medium, which has a function of generating a reproduction signal in a region having a predetermined temperature. According to the super-resolution readout method, it is possible to reproduce a signal at a resolution level higher than the resolution of a light beam, which is determined by the wavelength of its light source and the aperture of its collective lens. Thus, it is possible to realize a high-density optical disk apparatus. Specifically, according to the super-resolution readout method, a recording density can be improved up to about 0.2 $\mu$m/bit in a liner density direction and about 0.6 $\mu$m/track.

In order to produce an optical disk according to the super-resolution readout method, it is necessary to preformat addresses (e.g., sector numbers or track numbers which are recorded in sector identification regions) by providing emboss pits on the disk. However, such emboss pits do not provide the super-resolution effect. As a result, when an address is recorded in a narrow track pitch of about 0.6 $\mu$m, errors are generated due to cross-talk from an adjacent track. Consequently, the address cannot be reproduced. In order to avoid such a problem, an optical disk in which addresses are recorded so as not to be adjacent to each other between two adjacent tracks has been suggested (e.g., U.S. Pat. No. 5,422,874).

Such optical disks wherein addresses are previously recorded by emboss pits are made by producing a master first and making reproduction using the master by means of injection or the like. Such a master is generally produced as follows. A photoresist film is formed on a circular glass substrate. A light beam such as an argon laser, krypton laser, or the like is collected onto the photoresist film while the glass substrate is being rotated in a precise manner. Portions of the photoresist film such as the grooves or the pits, which are exposed to light by the collected light, are photosensitized. Thereafter, the photoresist film is developed, thereby obtaining a photoresist film having a predetermined pattern (i.e., grooves or pits). Using the thus-obtained photoresist film as a mask, the glass substrate is etched so as to form grooves, emboss pits, and the like on the surface of the glass substrate. Next, the resist film is removed, and the surface of the glass substrate is then made to be conductive. Finally, electrodeposition of nickel or the like is performed for the conductive glass substrate. In the manner as described above, the optical disk master is produced.

In recent years, upon producing a high density master, an electron beam is often used instead of a light beam.

According to the optical disk disclosed in U.S. Pat. No. 5,422,874, address regions are positioned along respectively different radial directions between adjacent two tracks in order to realize a narrow track pitch. Therefore, the address region is required to have a length twice as long as the actually used data length of the address region at the expense of the capacity of the optical disk.

According to an optical disk wherein a data recording region is formed of a groove or a land (e.g., the optical disk disclosed in U.S. Pat. No. 5,422,874), it is extremely difficult to produce a master thereof. Specifically, in order to improve reproduction characteristics of emboss pits of address regions, each of the emboss pits needs to have a width of about 0.3 to about 0.4 $\mu$m. On the other hand, a groove region serving as data recording region needs to have a width of about 0.6 to about 0.7 $\mu$m which is about the same as the track pitch in order to equalize the reproduction characteristics at the groove region with that at the land region. According to the conventional method for producing an optical disk master, however, since the master is generally produced using one light beam or one electron beam, the width of the region exposed to light, which corresponds to the line width of such a beam, is constant. Therefore, it is extremely difficult to change the width of an address region from the width of a groove region.

In order to make the width of the address region and the width of the groove region different from each other, a method using two light beams having respectively different spot diameters has been known. However, in the case where a master is produced using two light beams, it is necessary to perform the alignment of the two light beams having different widths at an accuracy of about 0.1 $\mu$m or less. Thus, the production of the master is extremely difficult. Moreover, the width of the groove region on the master can only be made, at most, about 1.5 times as large as that of the address region.

SUMMARY OF THE INVENTION

An optical disk of this invention may have one region or may be concentrically divided into two or more regions, each of which includes a plurality of tracks. The plurality of tracks are further divided into a plurality of regions along radial directions. Addresses radially disposed along the tracks constitute address regions formed on the tracks. According to data arrangement of the address regions, data which is common between a first track and a second track adjacent to each other is recorded at positions aligned along a radial direction, and data which is different from each other between the first track and the second track is recorded at respectively different positions in a radial direction. With the optical disk having such a structure, the above-described problems can be solved.

A data region of the first track may be a groove, and a data recording region of the second track may be a land portion.

The optical disk reproducing apparatus according to the present invention reproduces an optical disk wherein a polarity of a signal used for tracking the first and the second tracks is inverted between the first track and the second track. The apparatus for reproducing such an optical disk includes a detector for detecting positional information of the address data in the address regions related to the first and the second tracks, and determining section for determining the polarity of a signal used for tracking based on information from the detector. With the apparatus having such a structure, the above-described problems can be solved.

The apparatus for reproducing an optical disk includes an address error detector corresponding to the first track and the second track. The apparatus may use information from the address error detector as information for determining the tracking polarity of the data regions of the first track and the second track.

According to one aspect of this invention, an optical disk includes at least one region along a radial direction, and a plurality of tracks provided in the at least one region. The at least one region contains address regions radially positioned on the plurality of tracks. In the address regions, data which is common between two adjacent tracks of the plurality of tracks is recorded at positions aligned along the same radial direction on the two adjacent tracks, and data which is not common between the two adjacent tracks is recorded at positions along different radial directions on the two adjacent tracks.

In one embodiment of the present invention, the plurality of tracks include a plurality of first tracks and a plurality of second tracks in which the address region includes the data which is common between the plurality of first tracks and the plurality of second tracks at a position along the same radial direction, and includes the data which is not common between the plurality of first tracks and the plurality of second tracks at positions along different radial directions. Each of the plurality of first tracks and each of the plurality of second tracks are alternately repeated.

In another embodiment of the present invention, the at least one region further includes a data recording region which is different from the address regions; and each of the plurality of first tracks in the data recording region is formed of a groove, and each of the plurality of second tracks in the data recording region is formed in a region between the grooves of two adjacent tracks of the plurality of first tracks.

In still another embodiment of the present invention, of the address regions positioned on the plurality of second tracks, each of the plurality of first tracks in the address region, where data which is different from each other between the plurality of first tracks and the plurality of second tracks is recorded, is formed of a groove.

According to another aspect of this invention, an apparatus reproduces data recorded in an optical disk having at least one region along a radial direction, and a plurality of tracks provided in the at least one region. The optical disk includes address regions radially positioned on the plurality of tracks provided in the at least one region. In the address regions, data which is common between two adjacent tracks of the plurality of tracks is recorded at positions aligned along the same radial direction on the two adjacent tracks, and data which is not common between the two adjacent tracks is recorded at positions along different radial directions on the two adjacent tracks; and a tracking polarity is changed at least one point in the two adjacent tracks. The apparatus includes: a detecting section for detecting record positions of data recorded in the address regions in the two adjacent tracks; and a determining section for determining a tracking polarity of a track being reproduced among the plurality of tracks based on an output from the detecting section.

In one embodiment of the present invention, the detecting section is an error detector for detecting error information in data recorded in the address regions so as to correspond to each of the two adjacent tracks; and the record position of the data is detected based on the detection of the error information for the data.

According to still another aspect of this invention, a method for producing an optical disk master includes the steps of: (a) providing a substrate having a photoresist film provided on a surface thereof; (b) rotating the substrate in a relative relationship with a beam; (c) irradiating the photoresist film on the substrate with the beam so as to form a first beam trace in the photoresist film; (d) further irradiating the photoresist film with the beam such that the beam partially overlaps the first beam trace, so that a second beam trace is formed in the photoresist film; and (e) completing the optical disk master using the photoresist film.

In one embodiment of the present invention, the step (d) comprises shifting the beam in a radial direction of the substrate and irradiating the photoresist film with the beam so as to form the second beam trace.

In another embodiment of the present invention, the step (d) includes formation of a second beam trace having a width which is larger than a half-value of the width of the beam in the photoresist film.

Thus, the invention described herein makes possible the advantages of (1) providing an optical disk having an improved recording density efficiency, and (2) providing a method for easily producing an optical disk master in which a width of each of emboss pits of address regions and a width of a groove region are different from each other using a light beam having a constant spot diameter.

These and other advantages of the present invention will become apparent to those skilled in the art upon reading and understanding the following detailed description with reference to the accompanying figures.

BRIEF DESCRIPTION OF THE DRAWINGS

FIGS. 3A to 3C are views for illustrating structures of an optical disk 200, and address number regions 205 and 207 according to Example 3 of the present invention;

FIGS. 6A to 6C are views for showing a part of an optical disk master produced according to Example 4 of the present invention, and the steps for producing the master.

DESCRIPTION OF THE PREFERRED EMBODIMENTS

Figure 1A:
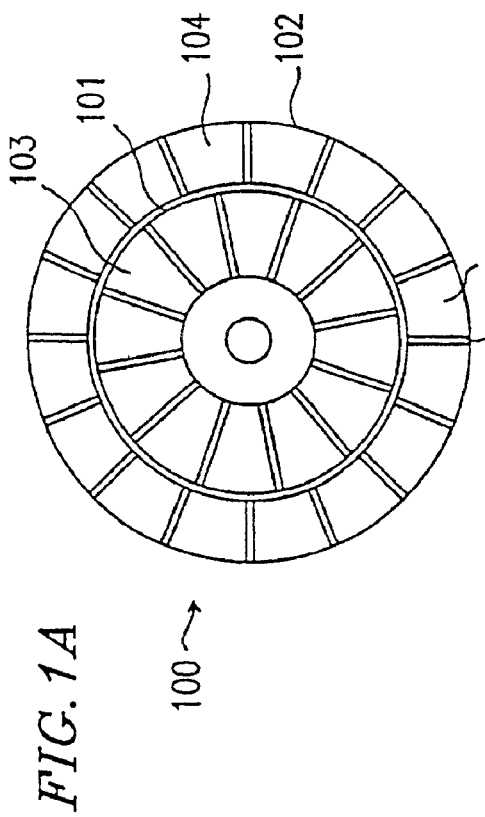
FIGS. 1A and 1B are views for illustrating the structures of an optical disk 100 and an address number region 105-1 thereof according to Example 1 of the present invention.

Hereinafter, the present invention will be described by way of illustrative, but non-limiting examples with reference to the accompanying drawings. The same components are denoted by the same reference numerals in the following examples.

EXAMPLE 1

FIG. 1A shows the structure of an optical disk 100 according to Example 1 of the present invention.

The optical disk 100 includes: a first zone 101 and a second zone 102, which are obtained by concentrically dividing the optical disk 100; sectors 103 obtained by dividing the first zone 101 into 12 sections along radial directions; sectors 104 which are obtained by dividing the second zone 102 into 16 sections along radial directions; address number regions 105-1 of the sectors 104 which are recorded by pits; and data recording regions 106 which record data of the sectors 104.

Although the optical disk 100 is concentrically divided into the first zone 101 and the second zone 102 in Example 1 of the present invention, the optical disk 100 may be divided into three or more zones.

Each of the first zone 101 and the second zone 102 is divided into sectors so that linear densities for tracks of the disk 100 are nearly the same. According to Examples of this invention described in this specification, the first zone 101 includes 12 sectors 103, the second zone 102 includes 16 sectors. However, conditions for dividing the first zone 101 and the second zone 102 into sectors are not limited thereto. The first zone 101 and the second zone 102 may be divided into sectors in accordance with other suitable conditions.

According to Example 1 and each of the later-described examples of the present invention, only sectors 104 along the outer periphery of the disk are mentioned upon describing the present invention. However, the present invention can be applied to the sectors 103 along the inner periphery of the disk in the same manner as in the sectors 104.

Figure 1B:
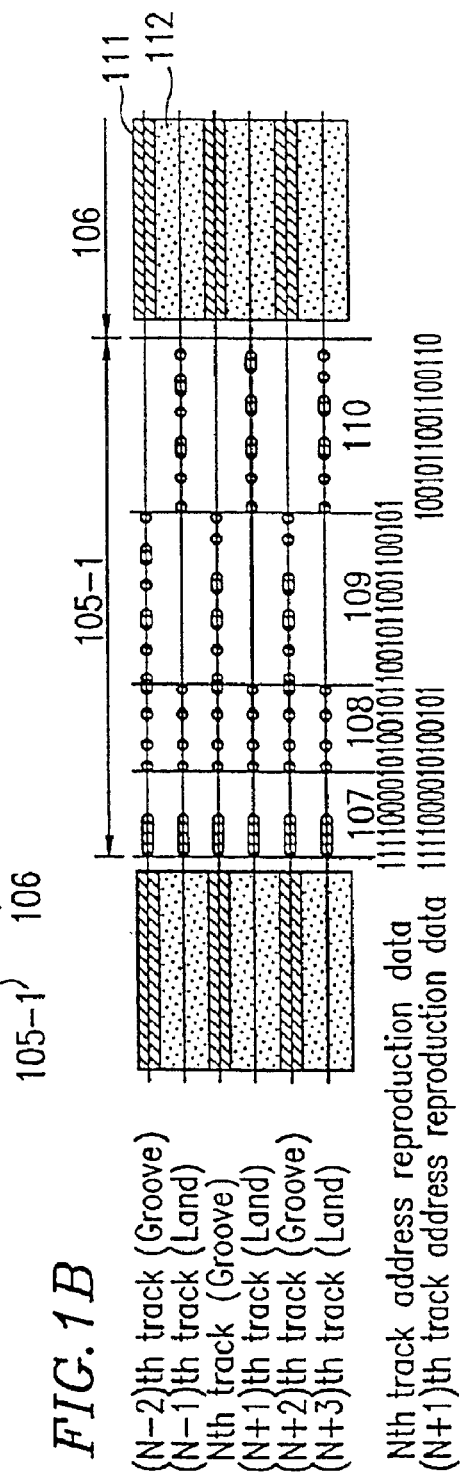

FIG. 1B shows the structures of the address number region 105-1 and the data recording region 106.

The address number region 105-1 includes: an address mark region 107 in which address marks for identifying the start points of address numbers are recorded; a sector number region 108 in which sector numbers are recorded; a first track number region 109 in which track numbers for groove tracks 111 are recorded; a second track number region 110 wherein track numbers for land tracks 112, each of which is interposed between the groove tracks 111, are recorded.

According to the optical disk 100 of Example 1, address marks and sector numbers between the adjacent tracks in one sector are respectively recorded at positions aligned along a radial direction of the optical disk 100. Specifically, the address marks are recorded in the address mark region 107, and the sector numbers are recorded in the sector number region 108. As to data recorded in the address mark region 107 and data recorded in the sector number region 108, a common value is assigned between the two adjacent tracks.

Track numbers can take different values between the two adjacent tracks. Track numbers are divided into track numbers at the time of groove tracking and track number at the time of land tracking. The thus divided track numbers are respectively recorded to the first track number region 109 and the second track number region 110 so that they are not adjacent to each other between adjacent tracks.

The data recording region 106 is created by the spiral groove tracks 111 used for tracking, and the land tracks 112, each of which is interposed between the groove tracks 111. Data to be recorded is recorded on the groove track 111 and the land track 112.

According to Example 1 of the present invention, a width of the groove 111 is set to be about 0.7 $\mu$m, and a width between grooves 111, i.e., a width of the land region, is set to be about 0.7 $\mu$m. According to the super-resolution readout method, even with such an extremely narrow track pitch, cross-talk from the adjacent track is greatly reduced in the data recording region 106. Therefore, it is possible to read out or write data at a low error rate.

In the sector number region 108, the first track number region 109, and the second track number region 110 in the address number region 105-1, data is recorded according to bi-phase modulation in which "1" is represented as "10" and "0" is represented as "01". In the address mark region 107, code 111000, which does not appear in the bi-phase modulation, is recorded as an address mark.

Since data in the address number region 105-1 is recorded as pits utilizing emboss pits of the disk, it is impossible to obtain super-resolution effect of the disk. Moreover, cross-talk may be generated. Thus, there is a possibility of not being able to reproduce data recorded in the address mark region 107 and the sector number region 108.

According to the aforementioned data configuration, however, even when cross-talk is generated as a result of not being able to obtain the super-resolution effect, address marks and sector numbers respectively recorded in the address mark region 107 and the sector number region 108 can be reproduced. This is because an interfering signal due to the cross-talk is the same as a track signal to be read out. Accordingly, the optical disk receives no influence from cross-talk. Thus, reading errors are not caused by cross-talk.

Both of address marks and sector numbers are recorded on the optical disk 100 so as to be adjacent to each other between the adjacent tracks, regardless of whether they are data for groove track 111 or data for land track 112. Therefore, as compared to the case where all pieces of address information in each of tracks are recorded so as not to be adjacent to each other, data length of the address number region 105-1 can be reduced by an amount equal to the length of data regions in the address mark region 107 and the sector number region 108. In other words, the capacity of the optical disk can be effectively utilized.

Track numbers for tracks positioned adjacent to each other are recorded in an alternate manner in the track number regions 109 and 110 on the optical disk 100 so as not to be adjacent to each other between two adjacent tracks depending on whether it is the track number for the groove track 111 or the track number for the land track 112. Thus, a pitch of the track in which a track number is recorded becomes twice as long as the track pitch of the address mark region 107 or the sector number region 108. As a result, cross-talk from the neighboring track is significantly reduced.

Although address marks and sector numbers can have common values, respectively, between adjacent tracks according to Example 1 of the present invention, kinds of data which can take a common value between adjacent tracks are not limited thereto. Even with data other than address marks and sector numbers, data which is common between adjacent tracks and data which is not common between adjacent tracks is recorded separately according to the optical disk of the present invention. Consequently, as compared to the conventional optical disk, the address number region 105-1 in the optical disk of this invention can be structured more efficiently and at an extremely low error rate.

In Example 1 of the present invention, a track number which is recorded in the first track number region 109 represents the track number for groove track 111, and a track number which is recorded in the second track number region 110 represents the track number for land track 112. However, track numbers in the first track number region 109 may represent track numbers for land tracks 112, and track numbers in the second track number region 110 may represent track numbers for groove tracks 111.

In each of the examples described hereinafter, the order of the region in which track numbers for groove tracks are recorded and the region in which track numbers for land tracks are recorded is not limited to the illustrated order.

EXAMPLE 2

In Example 1 of the present invention, even when a land region in the second track number region 110 (see FIG. 1B) is tracked, the address pits in the second track number region 110 serve as partial grooves. As a result, a large level of disturbance is caused in a tracking error signal.

In order to avoid an off-track phenomenon resulting from such disturbance, it is necessary to hold the tracking servo upon reading the second track number region according to the optical disk of Example 1.

An optical disk according to Example 2 of the present invention has the same structure as that of the optical disk described in Example 1 except for the structure of the track number region 110 (FIG. 1B) at the time of land tracking, which is included in the address number region 105-1 (FIG. 1B). Therefore, description regarding the structures other than that of the track number region are herein omitted.

Figure 2:
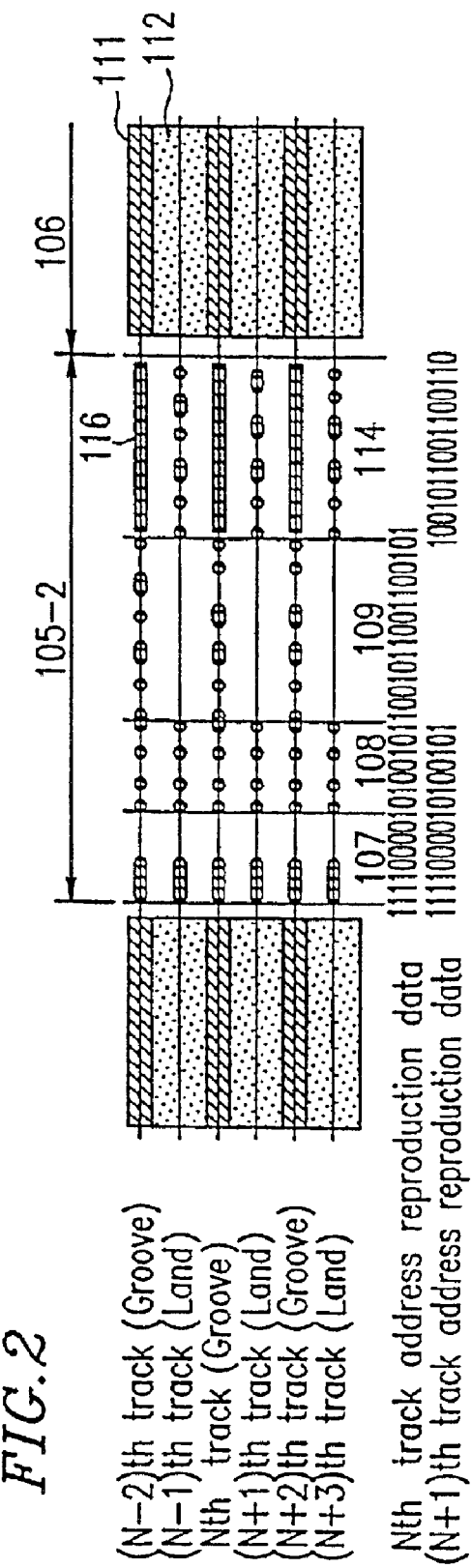
FIG. 2 is a view for illustrating the structure of an address number region 105-2 of an optical disk according to Example 2 of the present invention.

FIG. 2 shows the structure of an address number region 105-2 in the optical disk according to Example 2 of the present invention.

A track number region 114 which contains track numbers for the land tracks 112 includes a plurality of pits representing land track numbers on the land tracks. A groove 116 is formed on a track in which a plurality of pits in the track number region 114 are not formed.

An optical disk generally performs tracking of a land region utilizing an edge of the adjacent groove region. Therefore, it becomes possible to perform stable tracking of the land region by providing the groove 116. In other words, the level of disturbance at the time of tracking can be greatly reduced. As a result, it is no longer necessary to hold the tracking servo, which is required upon reproducing the optical disk of Example 1. Accordingly, by providing the groove 116, tracking can be stably performed even when the groove track 116 in the first track number region 109 and the data recording region 106 are reproduced.

EXAMPLE 3

FIG. 3A shows the structure of an optical disk 200 according to Example 3 of the present invention.

The optical disk 200 includes: a first zone 201 and a second zone 202, which are obtained by concentrically dividing the optical disk 200; sectors 203 obtained by dividing the first zone 201 into 12 sections along radial directions; sectors 204 which are obtained by dividing the second zone 202 into 16 sections along radial directions; address number regions 205 in the sectors 204, which are recorded by pits; data recording regions 206, in which data for the sectors 204 are recorded; an address number region 207 where switching between land tracking and groove tracking occurs; groove address regions 208 where track numbers and cyclic redundancy check (hereinafter, referred to simply as "CRC") error codes of groove tracks in the address number region 205 or 207 are recorded; and land address regions 209 where track numbers and CRC error codes of land tracks in the address number region 205 or 207 are recorded. A CRC error code is information used for detecting errors which occur while information recorded in an optical disk is read out.

Although the optical disk 200 is concentrically divided into the first zone 201 and the second zone 202 in Example 3 of the present invention, the optical disk 200 may be divided into three or more zones.

Each of the first zone 201 and the second zone 202 is divided into sectors so that linear densities for tracks of the disk 200 are the same. However, conditions for dividing the first zone 201 and the second zone 202 into sectors are not limited thereto. The first zone 201 and the second zone 202 may be divided into sectors in accordance with other suitable conditions.

According to the optical disk 100 (FIGS. 1A and 1B) of Example 1, since the shape of a groove in the data recording region is spiral, the groove region and the land region are not connected to each other. Accordingly, in order to reproduce the groove region of the Nth track and the land region of the (N+1)th track in a continuous manner, it is necessary to move a light spot for reproduction from the groove region to the land region, i.e., to perform a track jump.

Figure 4:
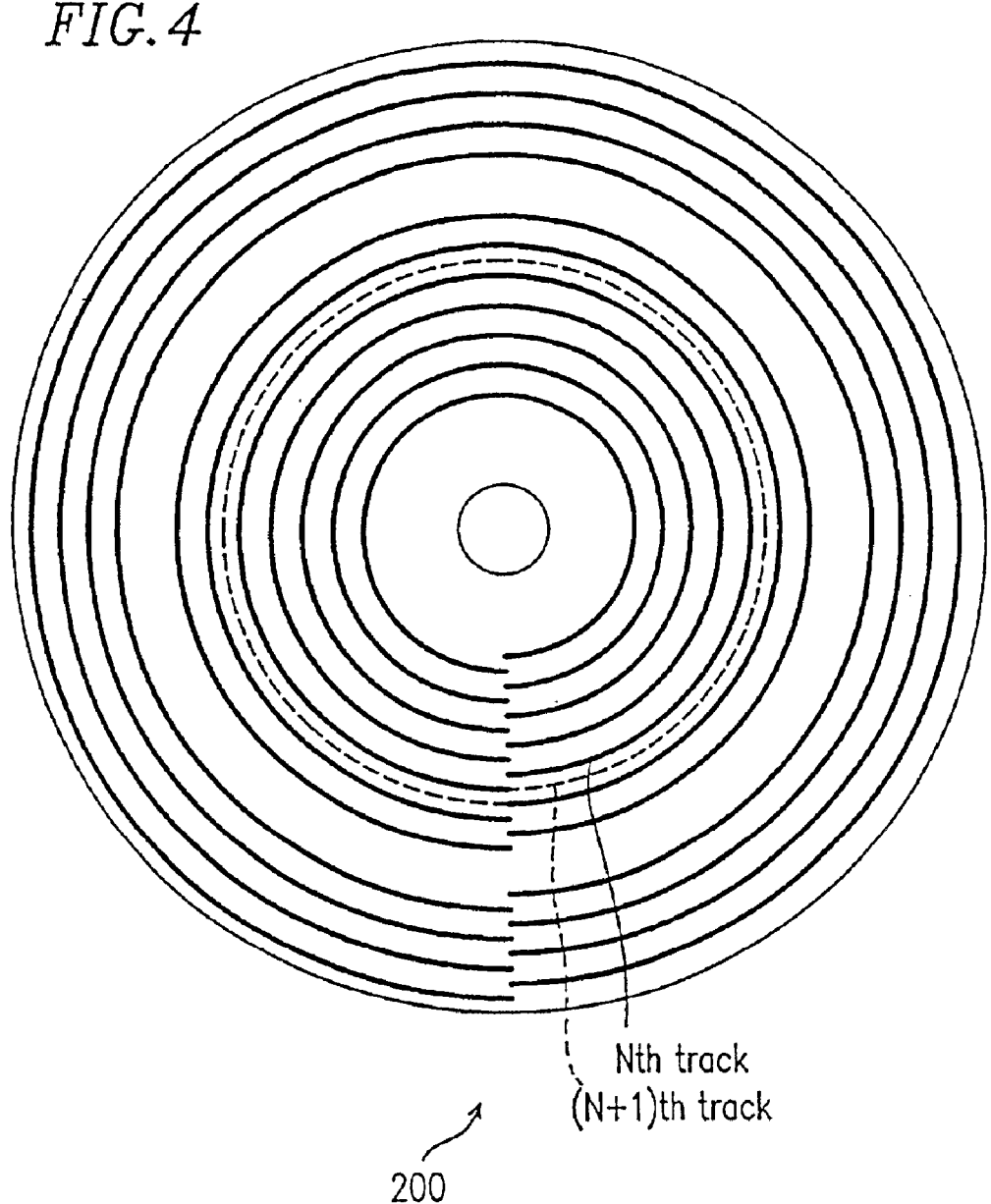
FIG. 4 shows the optical disk 200 having a structure wherein groove regions change to land regions at a part of the disk according to Example 3 of the present invention.

According to the optical disk 200 of Example 3, however, a groove region change to a land region at a point in a track of the disk as shown in FIG. 4. Therefore, an optical disk 200 having such a structure makes it possible to continuously reproduce the groove region and the land region of a track without performing a track jump. For example, immediately after reproduction for the groove region of the Nth track is completed, reproduction for the land region of the (N+1)th track automatically begins without performing a track jump.

Next, data arrangement for the optical disk 200 having the structure as shown in FIG. 4 will be described with reference to FIGS. 3B and 3C.

FIG. 3B shows the address number region 207 in the sector 204, where switching between groove region and land region is performed.

The address number region 207 includes: an address mark region; a sector number region; the groove address region 208; and the land address region 209. The address mark region and the sector number region in this example have the same structures as those of the address mark region and the sector number region described in Example 1. Specifically, address marks and sector numbers between the adjacent tracks are respectively recorded at positions aligned along a radial direction of the optical disk 200.

Each of the groove address region 208 and the land address region 209 includes track numbers and CRC error codes. Since track numbers and CRC error codes can take different values between adjacent tracks, respectively, the groove address region 208 and the land address region 209 are located on the optical disk 200 so as not to be adjacent to each other between adjacent tracks. As explained in Example 1 of the present invention, cross-talk can be avoided by such an arrangement.

Such address data, i.e., track numbers and CRC error codes, is recorded as follows. Address data for a groove track in the data recording region 206 is recorded in the groove address region 208. On the other hand, address data for a land track in the data recording region 206 is recorded in the land address region 209. Specifically, for a groove track in the data recording region 206 positioned next to the address number region 207, a track number and a CRC error code are recorded in the groove address region 208 in the address number region 207. At this time, the land address region 209 is blank. For a land track in the data recording region 206 positioned next to the address number region 207, a track number and a CRC error code are recorded in the land address region 209 in the address number region 207. At this time, the groove address region 208 is blank.

The address number region 205 shown in FIG. 3C is the address number region in the sector 204, where switching between a groove region and a land region is not performed. Address data included in the address number region 205 is recorded in the same manner as that described above. Specifically, address data for a groove track in the data recording region 206 is recorded in the groove address region 208, and address data for a land track in the data recording region 206 is recorded in the land address region 209.

Hereinafter, the case where the point at which a groove region is switched to a land region on the optical disk 200 of this example is reproduced, or the case where the point at which a land region is switched to a groove region is reproduced will be described.

Reproducing a groove region and a land region continuously without performing a track jump indicates that tracking polarity (i.e., position) changes from land to groove, or groove to land, with the address number region 207 serving as a boundary. Such a change in tracking polarity (i.e., position) may occur at a point or a plurality of points in two adjacent tracks. By detecting such a change in tracking polarity or position, it is possible to determine whether the data recording region 206 positioned next to the address number region 207 corresponds to a groove region or land region.

A recording position for a track number and a CRC error code is determined in accordance with tracking position in the data recording region 206 which comes after the address number region 207.

By recording optical disk track numbers and CRC error codes in the address number region 207 as described above, it is possible to determine tracking position in the data recording region 206, using error information read out from the address number region 207.

Hereinafter, a method for determining tracking position will be described with reference to FIG. 5.

Figure 5:
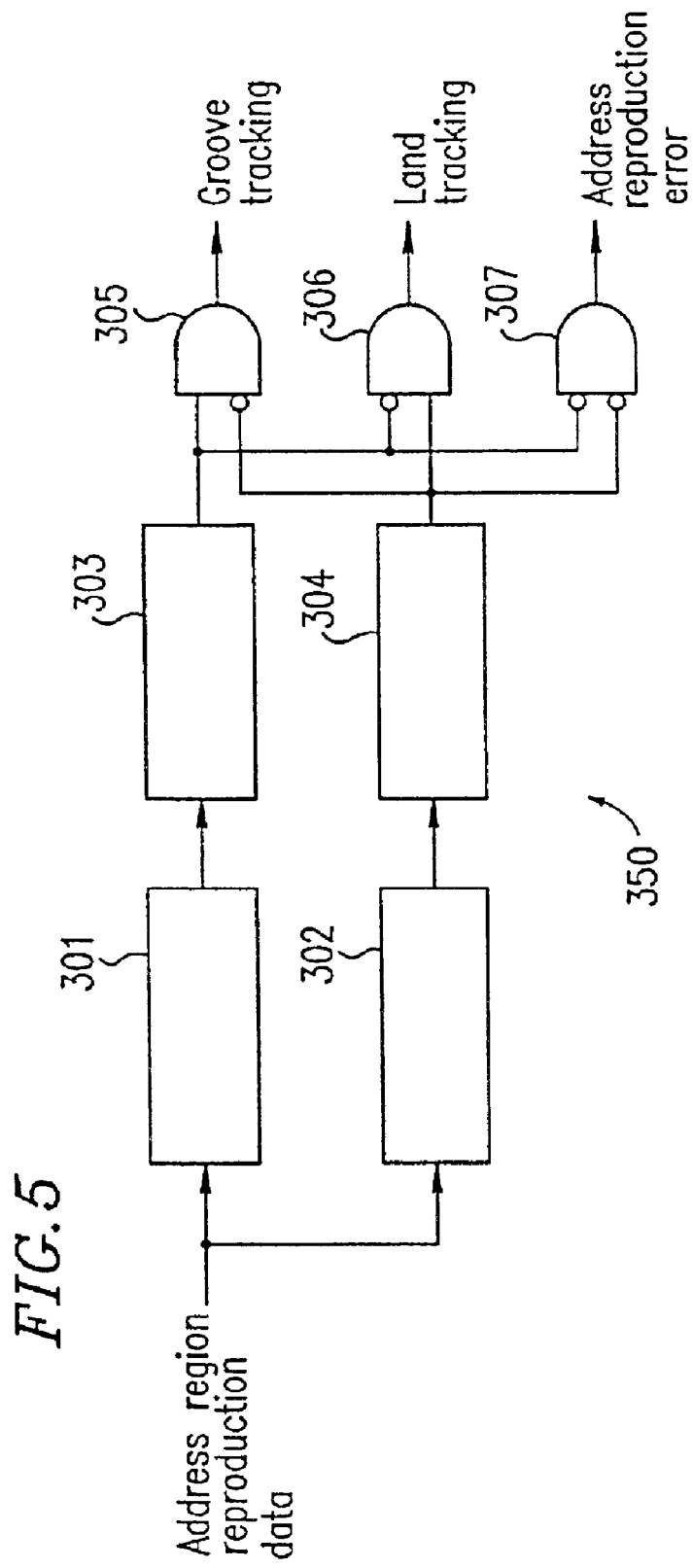
FIG. 5 is a block diagram showing a device 350 for determining tracking position according to Example 3 of the present invention.

FIG. 5 is a block diagram showing the structure of a device 350 for determining tracking position (hereinafter, referred to as "tracking position determining device") in an apparatus for reproducing an optical disk according to Example 3 of the present invention. The tracking position determining device 350 is included in the apparatus for reproducing an optical disk.

The tracking position determining device 350 includes: address demodulators 301 and 302 for demodulating data recorded in the groove address region 208 and the land address region 209 shown in FIG. 3, respectively; sections 303 and 304 for determining CRC errors of data demodulated in the address demodulators 301 and 302, respectively (hereinafter, referred to as "error determining sections"); and AND gates 305 to 307.

The address demodulators 301 and 302 demodulate address data which is read out. The error determining sections 303 and 304 output "1" when no address demodulation error occurs, and output "0" when address demodulation error occurs. The error determining sections 303 and 304 make a determination regarding the occurrence of an error using a CRC error code as described above. Such a determination entails determining whether a CRC error code is recorded in a region of the track presently being reproduced and as to which area of the track the CRC error code is recorded in. Therefore, the error determining sections 303 and 304 are used for detecting the record position of a CRC error code. The AND gates 305 to 307 receive determination results from the error determining sections 303 and 304, and output a signal indicating one of the following three cases: the read address data is address data which performs groove tracking; the read address data is address data which performs land tracking; and reproduction error. Based on the output, a section for determining the tracking position (not shown) in the optical disk reproducing apparatus determines the tracking position of the track presently being reproduced.

Hereinafter, the case where the Nth track and the (N+1)th track in the address number region 205 (FIG. 3C) are reproduced using the address demodulators 301 and 302 will be described.

As to the Nth track in the address number region 205 (FIG. 3C), a track number and a CRC error code are recorded in the groove address region 208 (FIG. 3C). In this case, the output of the error determining section 303 becomes 1, and the output of the error determining section 304 becomes 0. Then, a signal indicating groove tracking is output by the AND gate 305. As a result, the reproducing apparatus which is reproducing the groove region at that time determines that the subsequent reproduction position is also in groove region, based on the signal indicating groove tracking which is output from the tracking position determining device 350.

As to the (N+1)th track in the address number region 205 (FIG. 3C), a track number and a CRC error code are recorded in the land address region 209 (FIG. 3C). In this case, the output of the error determining section 303 becomes 0, and the output of the error determining section 304 becomes 1. Then, a signal indicating land tracking is output by the AND gate 306. As a result, the reproducing apparatus which is reproducing the land region at that time determines that the subsequent reproduction position is also in land region, based on the signal indicating land tracking which is output from the tracking position determining device 350.

In the case where the address number region 205 has defects, and both of the error determining sections 303 and 304 thereby indicate an error, the output of the AND gate 307 becomes 1, and a signal indicating address demodulation error is output. When address demodulation error occurs, the reproducing apparatus determines tracking position using the sector number of the sector previously reproduced and the sector number for the zone of the present tracking position, and determines that the subsequent reproduction position is in a groove region or a land region.

Next, the case where the Nth track and the (N+1)th track in the address number region 207 (FIG. 3B) are reproduced using the address demodulators 301 and 302 will be described.

The Nth track in the address number region 207 (FIG. 3B) changes from a groove track to a land track around the address number region 207 (FIG. 3B).

As to the Nth track in the address number region 207 (FIG. 3B), a track number and a CRC error code are recorded in the land address region 209 (FIG. 3B). In this case, the output of the error determining section 303 becomes 0, and the output of the error determining section 304 becomes 1. Then, a signal indicating land tracking is output by the AND gate 306. As a result, the reproducing apparatus which is reproducing the groove region at that time determines that the subsequent reproduction position corresponds to a land region, based on the signal indicating land tracking which is output from the tracking position determining device 350.

As to the (N+1)th track in the address number region 207 (FIG. 3B), a track number and a CRC error code are recorded in the groove address region 208 (FIG. 3B). In this case, the output of the error determining section 303 becomes 1, and the output of the error determining section 304 becomes 0. Then, a signal indicating groove tracking is output by the AND gate 305. As a result, the reproducing apparatus which is reproducing the land region at that time determines that the subsequent reproduction position corresponds to a groove region, based on the signal indicating groove tracking which is output from the tracking position determining device 350.

As described above, by changing format in the address recording region depending on whether the position to be reproduced next corresponds to groove region or land region, it is possible to easily detect tracking position to be reproduced next even when tracking position changes from groove region to land region, or from land region to groove region.

EXAMPLE 4

In Example 4 of the present invention, a method for producing a master for optical disks such as the optical disks described in Examples 1 to 3 of the present invention will be described.

In terms of reproduction characteristics, it is most preferable that a pit width in the address number region 105-1 (FIG. 1B) of the optical disk 100 (FIG. 1A) is in the range of about 0.3 to about 0.4 $\mu$m, and a width of a groove used for tracking in the data recording region is about 0.7 $\mu$m which is the same value as the track pitch. Hereinafter, a method for producing an optical disk master 400 according to this invention, which has the above-described pitch width and groove width will be described with reference to FIGS. 6A, 6B, and 6C.

FIG. 6A shows the structure of a part of the optical disk master 400 which is produced according to the method for producing an optical disk master of Example 4.

The optical disk master 400 includes: groove regions 401 which are data recording regions; a common address data region 402 containing address marks, sector numbers, and the like; a first uncommon data region 403 containing groove track numbers and the like; a second uncommon data region 404 containing land track numbers and the like; deformed portions 406 of the groove regions resulting from deformation in parts of the groove regions; and land regions 405 which are data recording regions. Each groove region 401 and each land region 405 constitute a track 407.

Hereinafter, the method for producing the master having the pattern shown in FIG. 6A will be described with reference to FIGS. 6B and 6C. As to FIGS. 6B and 6C, production of the master is performed in the order from the left side in the figures towards the right side. As to FIG. 6A, production of tracks 407 is performed in the order from the top side in the figure towards the bottom side.

In order to simplify the description for the method for producing the master, the description will start with the state where a photoresist film is formed on a circular glass substrate in Example 4 of the present invention. In order to form the photoresist film on the circular glass substrate, any well known method may be used. The term "cutting" as used herein refers to the formation of a mark region or a portion to be a groove later in the photoresist film formed on the circular glass substrate during the production of the optical disk master.

FIG. 6B shows the state where cutting of the photoresist film is performed using light beam during the first rotation of the substrate. Cut portions are indicated by halftone dots.

A part of the groove region 401 is cut by irradiation of light beam which is displaced from the center line of the track 407 by an amount of P.

Next, the amount of light beam displacement P is set to be zero, and cutting of the common data region 402 and the first uncommon data region 403 is performed.

Thereafter, cutting of the groove region 401 is performed again by means of irradiation of light beam which is displaced from the center line of the track 407 by an amount of P. The cutting of the deformed portion 406 of the groove region can be realized by increasing the displacement amount P regarding irradiation position of light beam.

By changing the displacement amount P during the first rotation of the substrate as described above, a pit and a part of a groove is cut.

FIG. 6C shows the state where cutting of the photoresist film is performed using light beam during the second rotation of the substrate. Cut portions are denoted by the hatched portions.

During the second rotation of the substrate, the groove region 401, which has been partially cut during the first rotation of the substrate, is further cut.

Light beam irradiation position during the second rotation of the substrate is shifted toward a direction closer to the desired cut portion of the groove region 401, from the center of the track following the track which has been cut during the first rotation of the substrate, by an amount of Q. At this time, the groove portion 401 is cut so that the cut portion during the second rotation of the substrate partially overlaps the cut portion during the first rotation of the substrate.

Next, the amount of light beam displacement Q is set to be zero, and cutting of the common data region 402 and the second uncommon data region 404 is performed. The cutting of the deformed portion 406 of the groove region can be realized by setting the aforementioned displacement amount Q to be a smaller value. At this time, the deformed portion 406 of the groove region is cut so that a light beam trace during the second rotation of the substrate partially overlaps the light beam trace during the first rotation of the substrate.

After the cutting is completed, it is possible to produce the optical disk master using the photoresist film in which light beam traces are formed. Since the following steps up until the completed master is obtained are the same as those already known in the art, the description thereof is herein omitted.

According to the above-described cutting method, cutting of any position, or a mark region or a groove region 401 of any shape can be performed by shifting a light beam or an electron beam in a radial direction at any position on the substrate so that the light beam trace during the first rotation of the substrate partially overlaps the light beam trace during the second rotation of the substrate.

For example, a desired portion of a large mark region (i.e., the common data region 402 and the uncommon data regions 403 and 404) or the groove region 401, which has a width greater than the half-value width of a light beam, can be cut so as to produce an optical disk master.

For example, it is possible to easily produce an optical disk master in which a width of each of the emboss pits of address regions and a width of a groove region have different values.

Even with the conventional master producing apparatus using two light beams, it is difficult to form the deformed portion 406 having a groove width different from that of the groove region 401 in a part of the groove region 401. According to the method for producing an optical disk master in Example 4 of the present invention, however, the deformed portion 406 of the groove region 401 can be easily produced simply by changing the running position of a light beam. This is because it is relatively easy to control the running position of one light beam at a 0.1 μm level or less. By using the above-described method, the need for using an expensive master producing apparatus, having two light beams, is eliminated.

Example 4 of the present invention describes the case where cutting is performed without changing the intensity of a light beam. However, by changing the intensity of the light beam as necessary, the width of the mark region and the width of the groove region 401 can be varied more flexibly. More specifically, the width of the groove region can be made about three times as large as the width of the mark region.

According to the description above, the light beam irradiates the rotating glass substrate. However, this is only one example wherein cutting is performed by relative movement of a light beam and glass substrate. The present invention is not limited to the case where the glass substrate rotates. For example, the glass substrate may be fixed and irradiated with a rotating light beam.

Although a light beam irradiates the rotating glass substrate in Example 4 of the present invention, any beam can be used as long as the photoresist film is exposed by the beam. For example, an electron beam or the like can be used.

According to the optical disk of the present invention, data which is common between two adjacent tracks of the plurality of tracks is recorded at positions aligned along the same radial direction on the two adjacent tracks, and data which is not common between two adjacent tracks is recorded at positions along different radial directions on the two adjacent tracks. Accordingly, the recording density efficiency is improved.

Moreover, errors caused by cross-talk can be avoided. Thus, it is possible to realize a high density disk with an address region having a high efficiency and a low error rate.

According to the present invention, it is possible to detect the tracking position of a track being reproduced, based on predetermined information recording in the track. Therefore, according to the present invention, upon reproducing the optical disk having a structure such that groove regions change to land regions at a part of the disk, it is possible to easily detect the tracking polarity position to be reproduced next even when the tracking polarity (i.e, position) changes from a groove region to a land region, or from a land region to a groove region.

According to the method for producing an optical disk master of this invention, since groove region on the optical disk master is formed by two substrate rotation processes, it is possible to easily produce, using one light beam, a master in which the width of each of emboss pits of the address regions and the width of the groove region are different from each other.

According to the method for producing an optical disk master of this invention, the deformed portion of the groove region can be easily formed simply by changing the running position of a light beam.

According to the method for producing an optical disk master of this invention, as compared to the method in which a groove of a wide width is formed simply by performing power control of one beam, it is possible to suppress formation of a blunt edge in the groove, and to change a range of a groove width.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing an optical disk master, comprising the steps of:
   (a) providing a substrate having a photoresist film provided on a surface thereof;
   (b) rotating the substrate in a relative relationship with a beam;
   (c) during a rotation of the substrate, irradiating the photoresist film on the substrate with the beam so as to form a first beam trace in the photoresist film;
   (d) during a rotation which is subsequent to the rotation during which the first beam trace is formed, further irradiating the photoresist film with the same beam such that the beam partially overlaps the first beam trace, so that a second beam trace is formed in the photoresist film; and
   (e) completing the optical disk master using the photoresist film,
   wherein the second beam trace comprises a data region in a track adjacent to the first beam trace.

2. A method for producing an optical disk master according to claim 1, wherein the step (d) comprises shifting the beam in a radial direction of the substrate and irradiating the photoresist film with the beam so as to form the second beam trace.

3. A method for producing an optical disk master according to claim 1, wherein step (d) comprises formation of a second beam having a width which is larger than a half-value of the width of the beam in the photoresist film.

4. A method for producing an optical disk according to claim 1, wherein the first and second beam traces define a deformed portion of a track, wherein the deformed portion is non-overlapping with an adjacent trace.

5. A method for producing an optical disk, comprising the steps of:
   (a) providing a substrate having a photoresist film provided on a surface thereof;
   (b) rotating the substrate in a relative relationship with a beam;
   (c) during a rotation of the substrate, irradiating the photoresist film on the substrate with the beam so as to form a first beam trace in the photoresist film;
   (d) during a rotation which is subsequent to the rotation during which the first beam trace is formed, further irradiating the photoresist film with the same beam such that the beam partially overlaps the first beam trace, so that a second beam trace is formed in the photoresist film;
   (e) completing an optical disk master using the photoresist film; and
   (g) producing the optical disk using the optical disk master,
   wherein the second beam trace comprises a data region in a track adjacent to the first beam trace.

6. A method for producing an optical disk according to claim 5, wherein the first and second beam traces define a deformed portion of a track, wherein the deformed portion is non-overlapping with an adjacent trace.

* * * * *

UNITED STATES PATENT AND TRADEMARK OFFICE
CERTIFICATE OF CORRECTION

| | | |
|---|---|---|
| PATENT NO. | : 6,887,652 B2 | Page 1 of 1 |
| DATED | : May 3, 2005 | |
| INVENTOR(S) | : Yasumori Hino, Norio Miyatake and Tadashi Nakamura | |

It is certified that error appears in the above-identified patent and that said Letters Patent is hereby corrected as shown below:

<u>Column 16,</u>
Line 10, "wherein step (d)" should read -- wherein the step (d) --; and
Line 11, "second beam having" should read -- second beam trace having --.

Signed and Sealed this

Sixth Day of September, 2005

JON W. DUDAS
*Director of the United States Patent and Trademark Office*